March 29, 1949.  W. F. HOHLER  2,465,686
ANIMAL TRAP
Filed March 15, 1947  2 Sheets-Sheet 1
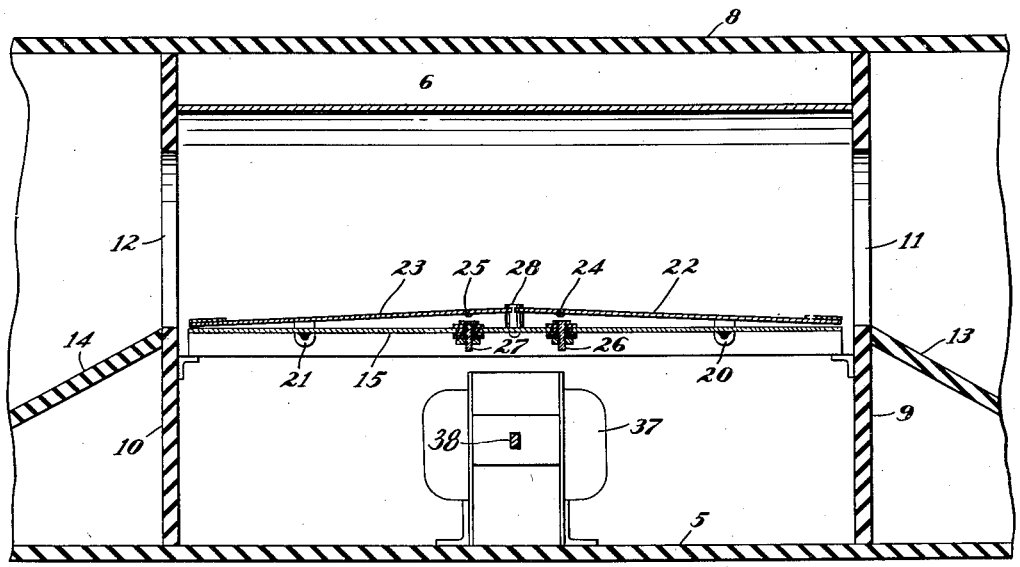
Fig. 1
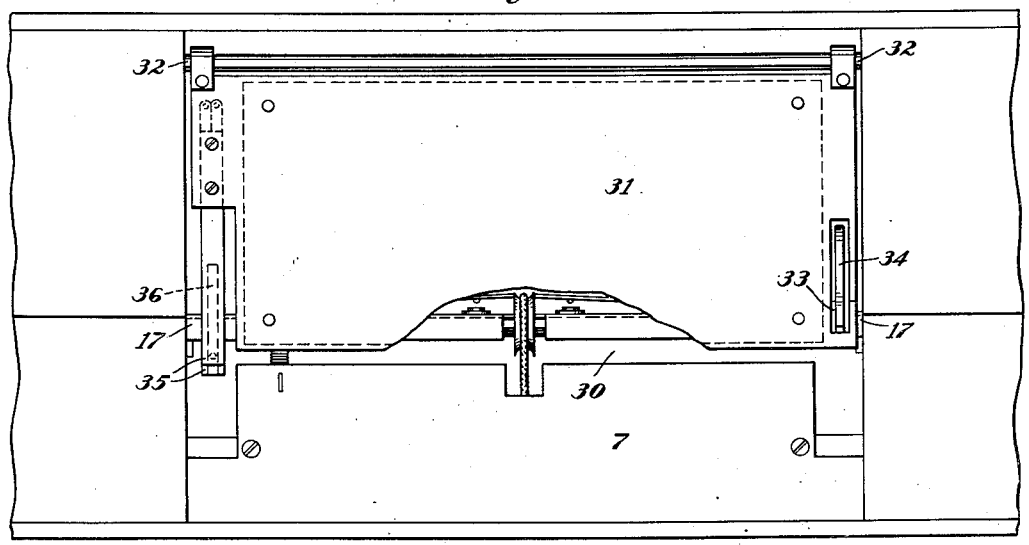
Fig. 2
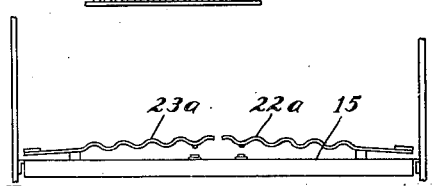
Fig. 6
Fig. 7
INVENTOR.
W. F. HOHLER
BY
D. Clyde Jones
ATTORNEY

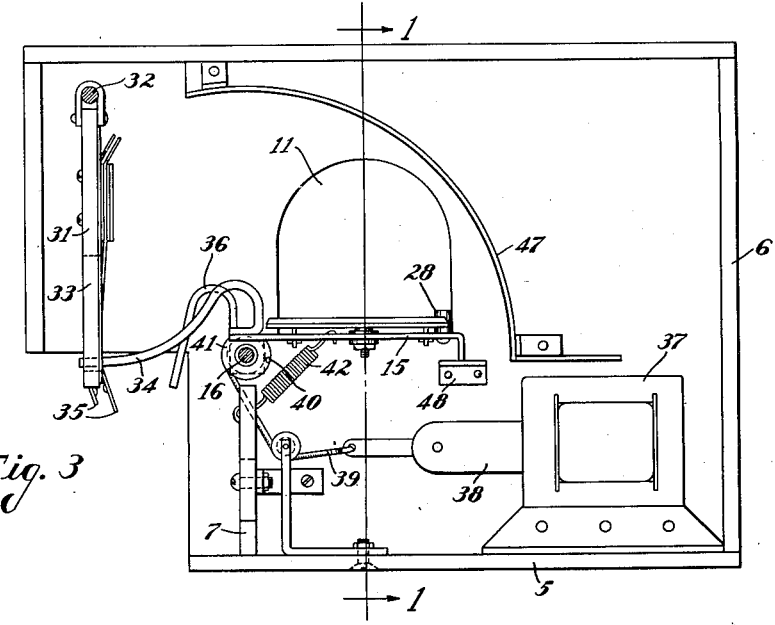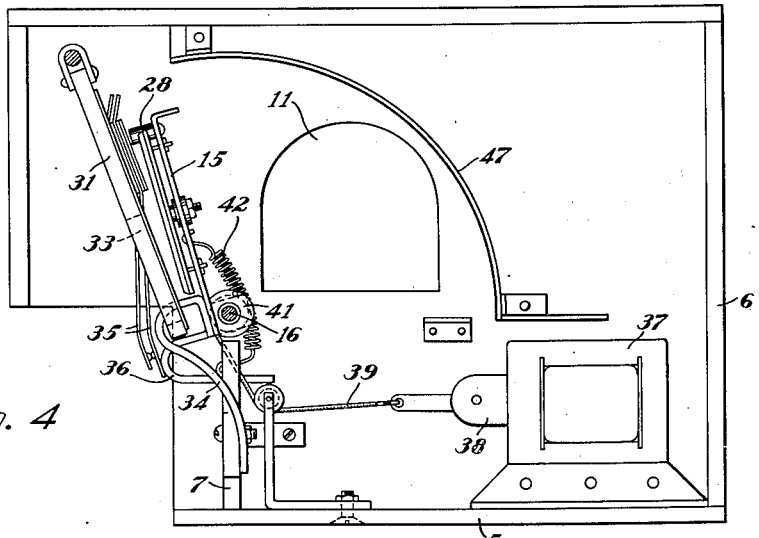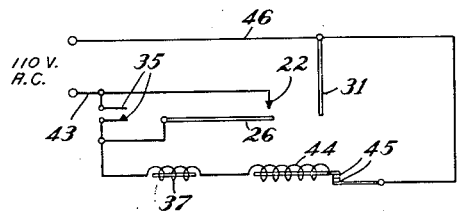

Patented Mar. 29, 1949

2,465,686

UNITED STATES PATENT OFFICE 2,465,686

ANIMAL TRAP

Walter F. Hohler, Rochester, N. Y., assignor, by mesne assignments, to Newhome Corporation, Rochester, N. Y., a corporation of New York Application March 15, 1947, Serial No. 734,883

8 Claims. (Cl. 43—99)

1

This invention relates to an animal trap which electrocutes a captured animal and subsequently resets itself for repeated use.

The present invention has for its purpose the provision of a trap of the mentioned type which is relatively simple and inexpensive and which is reliable in operation.

The various features and advantages of the invention will appear from the detailed description and claims when taken with the drawings in which:

Fig. 1 is a vertical longitudinal section taken through the trap on the line 1—1 of Fig. 3;

Fig. 2 is a side elevational view of the trap, particularly showing one of the execution electrodes and the ejection opening concealed thereby;

Figs. 3 and 4 are end views of the trap with one of the ends thereof removed, Fig. 3 showing the several parts in their normal or set positions and Fig. 4 showing these same parts in their tripped positions;

Fig. 5 is an electrical wiring diagram of the trap; and

Figs. 6 and 7 illustrate modified forms of electrodes.

The animal trap of this invention comprises a receptacle having a bottom 5, sides 6 and 7, a top 8, as well as ends 9 and 10. These ends are provided with opposed openings 11 and 12 to which the ramps 13 and 14 extend from the floor level, to afford easy access for the animal into the trap. There is rotatably mounted within the trap, a switch plate 15 which functions not only to trip the trap but also serves as one of the execution electrodes thereof, as will be further described. This plate is secured to a shaft 16 which is pivoted at points 17 (Fig. 2) in the respective ends of the trap, and in its normal or set condition, extends between the openings 11 and 12. The plate 15 has pivotally supported at positions 20 and 21 thereon, a pair of switch elements 22 and 23 which are substantially coextensive with the plate. These elements are so counterweighted that they normally incline upward and thus maintain the contactors 24 and 25 carried thereby, out of engagement with the contactors 26 and 27 insulatedly mounted in the plate 15.

It will be noted that the side 7 of the trap is cut away to provide an ejection opening 30. A second execution electrode 31 is pivotally suspended at the points 32 and appears as a flap which tends to conceal the major portion of the ejection opening 30. The electrode 31 which is

2 normally suspended in a vertical position, is provided in one of its lower corners with a slot 33. This slot is adapted to be engaged by a cam-shaped hook 34, carried by the adjacent corner of the switch plate 15. It will be understood that the shape of the hook 34 is such that as the plate 15 is moved to the position shown in Fig. 4, in the manner to be described, the electrode 31 will be drawn by a swinging movement toward the plate tending to squeeze an animal caught therebetween. The other lower corner of the electrode 31 carries a pair of normal spaced spring contacts 35 which are insulated from each other. These spring contacts constitute a guard switch which is closed (Fig. 4) by the engagement therewith of the lug 36 carried on the plate 15. By the use of this guard switch, electrocuting current is maintained on the electrode 22 in the event that the contactor 24 should become accidently separated from the contactor 26 while the plate 15 is being moved to its upright position as shown in Fig. 4.

The tripping of the trap is effected by the energization of a solenoid 37 mounted on the bottom 5. The plunger 38 of this solenoid is connected by a cord 39 to a point 40 (Fig. 3) on the periphery of the pulley 41 around which it is partially wrapped. This pulley is secured to the shaft 16 on which the switch plate and electrode 15, are mounted. The shaft is spring biased to its position illustrated in Fig. 3 by a coil spring 42 or the like fastened at one of its ends to the side 7 and fastened at its other end to the plate 15.

The electrical wiring of the trap and its method of operation will best be understood by describing the capture of an animal as well as its subsequent electrocution. The animal is lured by suitable bait (not shown) within the trap to run up one of the ramps 13 or 14 and through the adjacent openings 11 and 12 respectively into the trap where it steps on one of the switch elements 22 or 23. Let it be assumed that the animal steps on element 22 which forces contact 24 into engagement with contactor 26 to close a circuit for energizing the solenoid 37. This circuit (Fig. 5) extends from one side 43 of the one hundred ten volt current source, through switch element 22, contactor 26, winding of the solenoid 37, through the heating coil 44 and through normally closed contacts 45 of a thermostatically controlled timing switch, to the other side 46 of the current source. When the solenoid 37 is energized, its plunger or core 38 is drawn to the right (Fig. 4). This motion of the plunger 38 is communicated through the cord 39 and pulley 41 into a rotary motion of the shaft 16. The shaft in turn swings the switch and electrode plate 15 with the animal thereon, into the position shown in Fig. 4. An arcuate roof member 47 prevents the animal from escaping from plate 15. As the electrode plate 15 is being swung to this position, the cam hook 34 engages the slot 33 in the lower corner of electrode 31 so that the two electrodes move toward each other to squeeze the animal therebetween. An insulating post 28 carried by the plate 15, prevents contact of this plate with electrode 31. This insures good electrical contact with the skin of the animal. The electrodes are held against the animal for a time interval long enough to insure its complete electrocution. This interval is measured by the thermostatically controlled switch 44 which heats up in a predetermined interval to open its contacts 45 and thereby deenergize the solenoid 37. This permits the coil spring 42 to restore the electrode 15 until its right hand edge rests on the ledge 48 (Fig. 3). As the electrode 15 is being restored, the cam hook 34 moves in the slot 33 so that the electrode 31 tends to move toward its normal vertical position. During this movement of the electrode 31 the electrocuted animal falls by gravity through the ejection opening 30.

In the modified form of the invention, illustrated in Figs. 6 and 7, the rear electrode 31a as well as elements 22a and 23a of the switch plate are provided with abrupt corrugations which extend generally in a vertical direction during the electrocution.

While the electrodes 15 and 31 are illustrated as comprising generally plane surfaces, one or both of the electrodes, can be longitudinally and/or transversely concaved so that they are cupped to substantially enclose and embrace the captured animal during electrocution.

This disclosure is given by way of example only and there can be many variations and modifications thereof, within the scope of the appended claims, without departing from the spirit of the present invention.

What I claim is:

1. In an animal trap, a receptacle having an opening therein, a pair of electrodes within said receptacle, means responsive to action by the animal within the receptacle for effecting movement of one of said electrodes, and means carried by said last-mentioned electrode and engaging the other electrode to force said electrodes toward each other.

2. In an animal trap, a receptacle having an opening therein, a pair of electrodes within said receptacle, means responsive to action by the animal within the receptacle for effecting movement of one of said electrodes, and means comprising a hook carried by one of said electrodes and engaging a part on the other electrode for drawing said electrodes together.

3. In an animal trap, a receptacle provided with a base and having an opening therein, a pair of cooperating electrodes within said receptacle, one of said electrodes being mounted to extend normally in a horizontal position and being arranged to move toward an upwardly extending position, a second electrode normally supported in an upwardly extending position beyond said base, and means responsive to action by the animal within the receptacle for effective relative movement of said electrodes into cooperative relation with each other.

4. In an animal trap, a receptacle having an opening therein, a number of cooperating electrodes, one electrode being pivotally supported adjacent its upper edge for suspension in a generally vertical direction, the second electrode being normally maintained in a horizontal position and being pivoted to swing on a horizontal axis located adjacent the lower portion of said first electrode, and means responsive to action by the animal within the receptacle for effecting movement of one of said electrodes.

5. In an animal trap, a receptacle having an opening therein, a pair of electrodes within said receptacle, means responsive to action by the animal within the receptacle for effecting movement of one of said electrodes, means comprising a cam-like hook carried by one of said electrodes and engaging a part on the other electrode for drawing said electrodes together, and means actuated by the movement of one of said electrodes for maintaining electrocuting current on said electrodes.

6. In an animal trap, a receptacle having an opening therein, a pair of electrodes within said receptacle, means responsive to action by the animal within the receptacle for effecting movement of one of said electrodes, at least one of said electrodes being provided with a corrugated, conducting surface to penetrate the fur of the animal, and means carried by said last-mentioned electrode for forcing both of said electrodes toward each other.

7. In an animal trap, a receptacle having an opening therein, a number of cooperating electrodes, one electrode being pivotally supported adjacent its upper edge for suspension in a generally vertical direction, the second electrode being normally maintained in a horizontal position and being pivoted to swing on a horizontal axis located adjacent the lower portion of said first electrode, means responsive to action by the animal within the receptacle for effecting movement of one of said electrodes with the animal between said electrodes, and means including said electrodes for executing the animal, each of said electrodes being provided with a corrugated conducting surface, said corrugations extending generally in an upward direction during electrocution of the animal.

8. In an animal trap, a receptacle provided with a base and having at least one opening therein, a pair of cooperating electrodes within said receptacle, one of said electrodes being mounted to extend normally in a horizontal position accessible to said opening and being arranged to move toward an upwardly extending position, a second electrode normally supported in an upwardly extending position beyond said base, and means including a solenoid, operated responsive to action by the animal within the receptacle, for effecting relative movement of said electrodes into cooperative relation with each other.

WALTER F. HOHLER.

REFERENCES CITED

The following references are of record in the file of this patent:

UNITED STATES PATENTS

| Number | Name | Date |
| --- | --- | --- |
| 2,411,766 | Vincent et al. | Nov. 26, 1946 |